United States Patent Office 3,044,496
Patented July 17, 1962

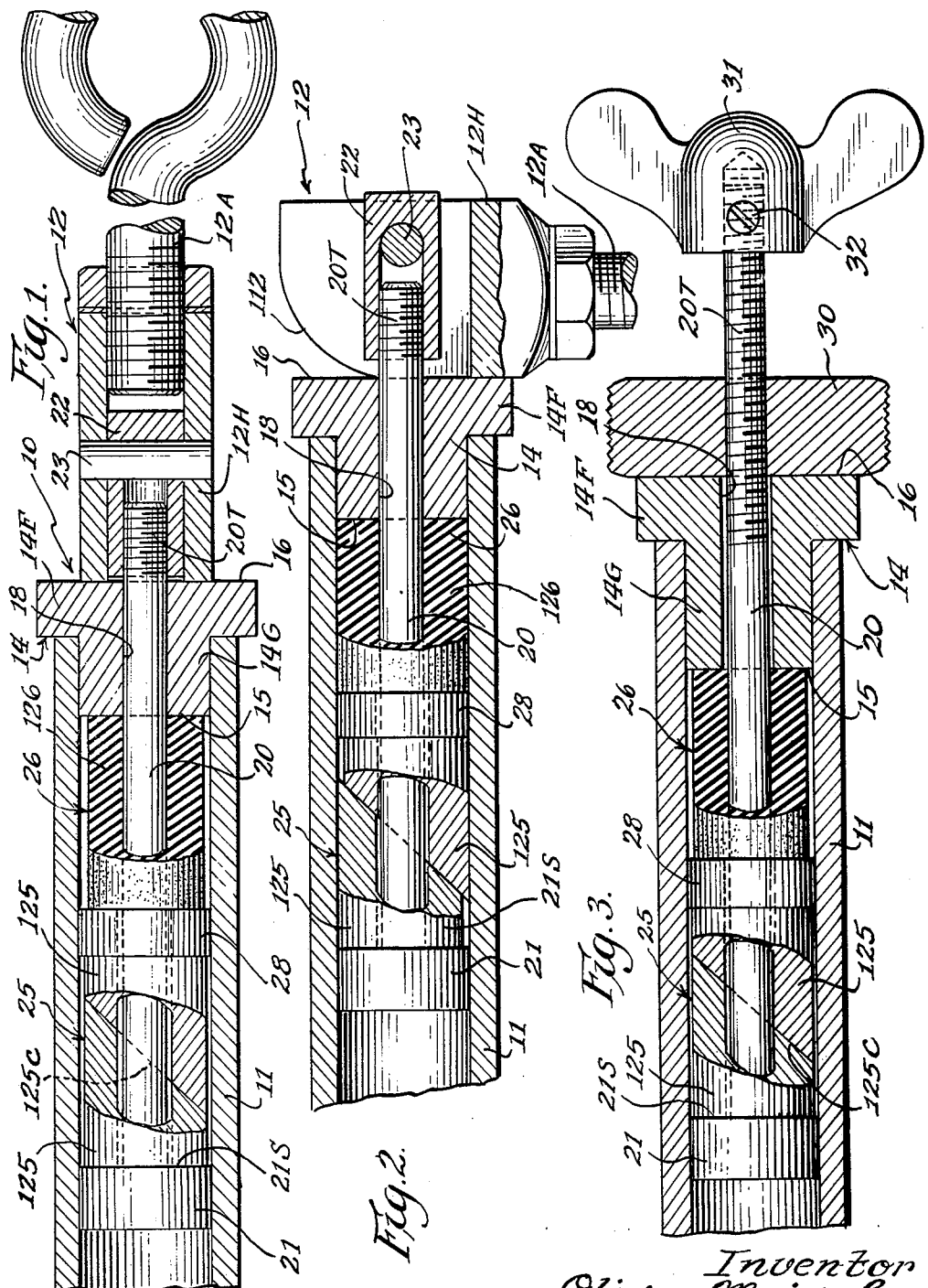

3,044,496
INTERNAL TUBE SEAL
Oliver Maisch, Chicago, Ill., assignor to Tuthill Pump
Company, Chicago, Ill., a corporation of Illinois
Filed Feb. 19, 1960, Ser. No. 9,773
3 Claims. (Cl. 138—89)

This invention relates to tube seals for sealing the end of a tube temporarily for testing, filling or like purposes, and more particularly, the invention relates to such a tube seal that accomplishes the sealing action by engagement with the internal surfaces of the tube.

Internal tube seals of the aforesaid character have been made and used heretofore, but the structures thereof have in most instances been relatively complicated and expensive in character, and in many instances the anchoring means that are expanded within the tube to anchor the tube seal in place have ruptured or otherwise damaged the inside of the tube.

In view of the foregoing it is the primary object of the present invention to provide an internal tube seal that is simple and economical in character and which may be readily and easily applied and released. An object related to the foregoing is to provide a tube seal of the aforesaid character wherein the anchoring means is extremely simple in its form and structure and in which the anchoring means have a broad area of surface engagement with the inside of the tube so as to prevent rupture or damage to the tube.

Other and further objects of the present invention will be apparent from the following description and claims, and are illustrated in the accompanying drawings, which, by way of illustration, show a preferred embodiment of the present invention and the principles thereof, and what is now considered to be the best mode in which to apply these principles. Other embodiments of the invention embodying the same or equivalent principles may be used and structural changes may be made as desired by those skilled in the art without departing from the invention.

In the drawings:

FIG. 1 is a longitudinal sectional view through an internal tube seal embodying the features of the invention;

FIG. 2 is a longitudinal sectional view taken through the device shown in FIG. 1 at an angle of 90° to FIG. 1, and showing the seal in its anchored, sealing position; and FIG. 3 is a view similar to FIG. 1 and illustrating an alternative form of operating means for the seal.

For purposes of disclosure the invention is herein illustrated as embodied in an internal tube seal 10 that is adapted to be inserted into an end of a tube 11 to seal the tube end, as for example, during a pressure testing operation that is to be performed in respect to the tube. The tube seal 10, after being inserted into the end of the tube, is anchored and sealed with respect to the tube 11 by operating means such as a cam lever 12, as will be described, and after the testing or like operation, the cam lever is again operated to release the seal 10 for removal from the tube.

The seal 10 comprises a body 14 having a cylindrical guide portion 14G adapted to extend into the end of the tube 11 to a limited extent as determined by an annular flange 14F at the outer end of the body 14. The body 14 has inner and outer faces 15 and 16 that are perpendicular to an axial bore or opening 18 that extends through the body, and it will be observed that the opening 18 has a diameter substantially less than the diameter of the guide portion 14G of the body. An operating stem 20 extends slidably through the opening 18, and at its inner end the stem 20 has a disk-like head 21 concentric with the stem 20 and of substantially the same diameter as the guide portion 14G of the body 14.

The projecting outer end of the stem 20 is threaded as at 20T, and a nut 22 is provided thereon for associating the cam lever 12 with the stem. The cam lever 12 comprises a bifurcated cam head 12H that embraces the nut 22 and is pivoted thereto by a transverse pin 23. An operating arm 12A is threaded into the head 12H for rocking the same about its pivot pin 23, and cam surfaces 112 are provided on the head 12H for withdrawing the stem 20 for a short distance in an outward direction when the arm 12A is rocked through an anchoring and sealing stroke from the position of FIG. 1 to the position of FIG. 2. When the stem 20 is thus withdrawn by the operating means, anchoring means 25 and sealing means 26 that are mounted on the stem 20 between the body 14 and the head 21 are rendered effective; and release of the stem 20 by return of the handle 12A to the position of FIG. 1, renders the anchoring means 25 and the sealing means 26 ineffective so that the tube seal 10 may be withdrawn from the tube 11.

The sealing means 26 comprises a resilient compressible sleeve 126 made from a material such as rubber and of a diameter substantially the same as the guide portion 14G of the head. The sleeve 126 fits snugly about the stem 20 and at one end engages the annular shoulder that is provided on the head 14 by the inner surface 15. At its other end the sealing sleeve 126 engages a rigid washer 28 that has a relatively close sliding fit on the stem 20 and has an outer diameter substantially the same as the diameter of the guide portion 14G of the head 14.

The anchoring means 25 is disposed on the stem 20 between the washer 28 and the head 21 of the stem, and under the present invention the anchoring means are simple in structure, and in operation, are urged outwardly with an expanding action wherein the internal surfaces of the tube are engaged over wide areas so as to avoid weakening or other damage in respect to the tube 11.

Thus the anchoring means 25 comprises a pair of rigid metal anchoring sleeves 125 surrounding the stem 20 between the head 21 and the washer 28, the two anchoring sleeves 125 being of the same diameter as the head 21 and having an internal diameter somewhat larger than the diameter of the stem 20 so that these sleeves 125 may be shifted laterally of the stem 20 in opposite directions to attain the desired anchoring action, as will be described. The remote ends of the two sleeves 125 are perpendicular to the axes of the sleeves so as to bear flat against the washer 28 and against the annular shoulder 21S that is provided on the adjacent end of the head 21.

The adjacent ends of the anchoring sleeves 125 are formed as engaging planar cam surfaces 125C that are disposed at an angle of substantially less than 90° to the axes of the sleeves 125, and these cooperating cam surfaces are effective, when the sleeves 125 are forced toward each other, to shift the two sleeves 125 radially outwardly in opposite directions to anchor the tube seal 10 in the tube 11. It will be observed that the side of each anchoring sleeve 125 that engages the tube is the side which has the greatest length and area, and hence the outwardly directed anchoring forces are applied to the tube and are effectually distributed so as to avoid damage to the tube 11.

In the operation of the tube seal 10 the withdrawal of the stem 20 as above described acts first to axially compress and radially enlarge or thicken the sealing sleeve 126 so as to effectually seal the sleeve 126 against the inside of the tube 11 as well as against the stem 20, and the anchoring sleeves 125 are then rendered effective to engage the inside of the tube with an anchoring action. In attaining this sequence of operation the angular location of the cam surfaces 125C is important. Thus, the angle of these surfaces with respect to the axis of the stem 20 must be sufficient to transmit the necessary compressive forces to the sealing sleeve 126 before the anchoring sleeves 125 become fully effective. This is dependent upon the compressibility of the sealing sleeve 126, and it has been found that the angle may in most instances be from about 45° to about 60° with respect to the stem axis.

It has been pointed out hereinabove that the power means for withdrawing the stem 20 may take different forms, and in FIG. 3 one such alternative form of operating means has been shown. Thus the internal tube seal shown in FIG. 3 is the same as that shown in FIGS. 1 and 2 except that the operating cam 12 has been replaced by other operating means. The stem 20 is somewhat longer, and adjacent the body 14, a knurled nut 30 is threaded onto the stem 20 so as to bear on the surface 16 of the body 14. At the end of the stem 20 a wing nut 31 is threaded onto the stem, and is secured in position by a set screw 32. With this arrangement the user may hold the stem against rotation by grasping the wing nut 31 and may rotate the nut 30 to withdraw the stem 20 and thus render the sealing means 26 and the anchoring means 25 effective.

From the foregoing description it will be apparent that the present invention provides a simple and effective internal tube seal, and that the tube seal of this invention exerts its anchoring pressures on the inside of the tube in such a manner that the tube is not ruptured or otherwise damaged in the use of the seal. While the seal of the present invention is useful in many different ways, it finds particular utility in devices that are intended for sealing relatively small tubes, and this advantage, of course, results in a large measure from the simplicity of the anchoring means that are employed under this invention.

Thus while a preferred embodiment of the invention has been illustrated herein, it is to be understood that changes and variations may be made by those skilled in the art without departing from the spirit and scope of the appending claims.

I claim:

1. In an internal tube sealer, a body adapted to be inserted slidably into an end of a tube to be sealed with an inner end face of the body disposed within the tube and disposed in perpendicular relation to the axis of the tube and with an outer end face disposed beyond the end of the tube, said body having an axial opening therethrough substantially smaller in diameter than the tube to be sealed, a stem extended slidably through said axial opening with its inner and outer ends projecting inwardly and outwardly beyond the respective inner and outer faces of the body, a head fixed on the inner end of said stem adapted to slide into such a tube end, said inner face of said body and the adjacent face of said head providing opposed annular clamping shoulders, a compressible resilient sealing sleeve surrounding said stem and having one of its ends abutting one of said shoulders, a rigid washer slidably surrounding the stem and abutting the other end of said sealing sleeve, anchoring means comprising a pair of rigid anchoring sleeves surrounding said stem in end to end relation between said washer and the other of said shoulders with their remote ends in flat surface engagement respectively with said washer and said other shoulder, said anchoring sleeves having an internal diameter greater than the diameter of the stem, and the adjacent ends of said anchoring sleeves being formed as opposed engaged planar surfaces disposed at an angle substantially less than 90° with respect to the axes of such anchoring sleeves to cam the respective anchoring sleeves radially outwardly in opposite directions into an anchoring relation in the tube when said anchoring sleeves are forced axially toward each other, and means acting between said body and outer end of the stem for withdrawing the stem relative to the body.

2. In an internal tube sealer, a body adapted to be inserted slidably into an end of a tube to be sealed with an inner end face of the body disposed within the tube and disposed in perpendicular relation to the axis of the tube and with an outer end face disposed beyond the end of the tube, said body having an axial opening therethrough substantially smaller in diameter than the tube to be sealed, a stem extended slidably through said axial opening with its inner and outer ends projecting inwardly and outwardly beyond the respective inner and outer faces of the body, a head fixed on the inner end of said stem adapted to slide into such a tube end, a compressible resilient sealing sleeve surrounding said stem and having one of its ends abutting the inner face of said body, a rigid washer slidably surrounding the stem and abutting the other end of said sealing sleeve, anchoring means comprising a pair of rigid anchoring sleeves surrounding said stem in end to end relation between said head and said washer with their remote ends in flat surface engagement respectively with said washer and said head, said anchoring sleeves having an internal diameter greater than the diameter of the stem, and the adjacent ends of said anchoring sleeves being formed as opposed engaged planar surfaces disposed at an angle substantially less than 90° with respect to the axes of such anchoring sleeves to cam the respective anchoring sleeves radially outwardly in opposite directions when said anchoring sleeves are forced axially toward each other, and means acting between said body and outer end of the stem for withdrawing the stem relative to the body.

3. In an internal tube sealer, a body adapted to be inserted slidably into an end of a tube to be sealed with an inner end face of the body disposed within the tube and disposed in perpendicular relation to the axis of the tube and with an outer end face disposed beyond the end of the tube, said body having an axial opening therethrough substantially smaller in diameter than the tube to be sealed, a stem extended slidably through said axial opening with its inner and outer ends projecting inwardly and outwardly beyond the respective inner and outer faces of the body, a head fixed on the inner end of said stem adapted to slide into such a tube end, anchoring means comprising a pair of rigid anchoring sleeves surrounding said stem in end to end relation between said head and said body, said anchoring sleeves having an internal diameter greater than the diameter of the stem, and the adjacent ends of said anchoring sleeves being formed as opposed engaged planar surfaces disposed at an angle substantially less than 90° with respect to the axes of such anchoring sleeves to cam the respective anchoring sleeves radially outwardly in opposite directions when said anchoring sleeves are forced axially toward each other, a resilient compressible sleeve surrounding said stem, and means acting between said body and outer end of the stem for withdrawing the stem relative to the body.

References Cited in the file of this patent

UNITED STATES PATENTS

| | | |
|---|---|---|
| 1,068,793 | Mason | July 29, 1913 |
| 1,205,891 | Harrison | Nov. 21, 1916 |
| 1,949,498 | Stone et al. | Mar. 6, 1934 |
| 2,375,995 | Koeser | May 15, 1945 |
| 2,475,748 | Leroy | July 12, 1949 |
| 2,937,666 | Maisch | May 24, 1960 |